US007704362B2

(12) United States Patent
Hamers et al.

(10) Patent No.: US 7,704,362 B2
(45) Date of Patent: Apr. 27, 2010

(54) APPARATUS FOR TRANSPORT AND ANALYSIS OF PARTICLES USING DIELECTROPHORESIS

(75) Inventors: Robert J. Hamers, Madison, WI (US); Joseph D. Beck, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1449 days.

(21) Appl. No.: 11/075,615

(22) Filed: Mar. 9, 2005

(65) Prior Publication Data

US 2006/0201811 A1 Sep. 14, 2006

Related U.S. Application Data

(60) Provisional application No. 60/658,683, filed on Mar. 4, 2005.

(51) Int. Cl.
*G01N 27/447* (2006.01)
*G01N 27/453* (2006.01)

(52) U.S. Cl. ....................................... 204/547; 204/643

(58) Field of Classification Search ................. 204/547, 204/643

See application file for complete search history.

(56) References Cited

U.S. PATENT DOCUMENTS

| | | | | |
|---|---|---|---|---|
| 4,326,934 | A * | 4/1982 | Pohl | 204/547 |
| 5,795,457 | A * | 8/1998 | Pethig et al. | 204/547 |
| 6,287,832 | B1 | 9/2001 | Becker et al. | |
| 6,596,143 | B1 | 7/2003 | Wang et al. | |
| 6,641,708 | B1 | 11/2003 | Becker et al. | |
| 6,703,819 | B2 | 3/2004 | Gascoyne et al. | |
| 6,764,583 | B2 | 7/2004 | Miles | |
| 6,787,018 | B1 | 9/2004 | Miles et al. | |
| 7,390,387 | B2 * | 6/2008 | Childers et al. | 204/547 |
| 2003/0157587 | A1 | 8/2003 | Gomez et al. | |
| 2004/0142463 | A1 | 7/2004 | Walker et al. | |
| 2006/0289341 | A1 * | 12/2006 | Muller et al. | 209/210 |

FOREIGN PATENT DOCUMENTS

WO WO 9810869 A1 * 3/1998

OTHER PUBLICATIONS

Lapizco-Encinas, Blanca H., et al., Insulator-based dielectrophoresis for the selective concentration and separation of live bacteria in water, Electrophoresis 2004, 25, 1695-1704; 2004 Weinheim.

Hughes, M.P., Strategies for dielectrophoretic separation in laboratory-on-a-chip systems. Electrophoresis 2002, (23) 2569-2581. Weinheim.

Fiedler, S., Shirley, S.G., Schnelle, T., Fuhr, G., Dielectrophoretic sorting of particles and cells in a microsystem. Analytical Chemistry 1998, (70) 1909-1915.

(Continued)

*Primary Examiner*—Alex Noguerola
(74) *Attorney, Agent, or Firm*—Boyle Fredrickson, S.C.

(57) ABSTRACT

Dielectrophoresis is used to attract particles to an electrode edge then to controllably allow the transport of particles along that edge under a fluid flow to a particular region. The particles may be bacteria which may be maintained in this process in a live state through capture, transport and release.

29 Claims, 1 Drawing Sheet

OTHER PUBLICATIONS

Pethig, R., Burt, J.P.H., Parton, A., Rizvi, N., Talary, M.S., Tame, J.A., Development of biofactory-on-a-chip-technology using excimer laser micromachining. Journal of Micromechanics and Microengineering 1998, (8) 57-63. United Kingdom.

Yang, J., Vykoukal, H., Noshari, J., Becker, F., Gascoyne, P. et al., Dielectrophoresis-based microfluidic separation and detection systems, International Journal of Advanced Manufacturing Systems 2000, (3) 1-12.

Suehiro, J., Pethig, R., The dielectrophoretic movement and positioning of a biological cell using a three-dimensional grid electrode system, Journal of Physics D: Applied Physics. 1998 (31) 3298-3305. IOP Publishing Ltd.

* cited by examiner

INFORMAL

APPARATUS FOR TRANSPORT AND ANALYSIS OF PARTICLES USING DIELECTROPHORESIS

CROSS REFERENCE TO RELATED APPLICATIONS

This application is based on provisional application 60/658,683 filed Mar. 4, 2005 and entitled "APPARATUS FOR TRANSPORT AND ANALYSIS OF PARTICLES USING DIELECTROPHORESIS", and claims the benefit thereof.

STATEMENT REGARDING FEDERALLY SPONSORED RESEARCH OR DEVELOPMENT

This invention was made with United States government support awarded by the following agencies: NSF 0210806. The United States has certain rights in this invention.

BACKGROUND OF THE INVENTION

The present invention relates to the manipulation and analysis of particles and, in particular, to a method suitable for manipulating and analyzing live bacterial cells.

The ability to manipulate and analyze nanoscale particles is potentially valuable in the assembly of nanoscale structures, for example, nanorods or nanotubes, into more complex structures. Such techniques could also prove useful in manipulating and analyzing single biological cells such as bacteria.

The manipulation of electrically polarizable particles within a poorly polarizable material (or poorly polarizable particles within a polarizable medium) can be accomplished by placing the particles in a spatially inhomogeneous electric field. In the case of polarizable particles, the field will induce equal and opposite charges on the particle. Unequal field strength will exist on each side of the particle because of the field inhomogeneity, producing a net dielectrophoretic force that pulls the particle toward the greater field concentration.

Such techniques have been used to trap particles and cells at electrodes by drawing the particles and cells to the electrode, or to hold cells within a cage formed of symmetrically balanced electrodes that repel the cell.

While such techniques allow the capture of extremely small particles in a liquid, the ability to precisely control the movement of constrained particles or cells is relatively limited.

BRIEF SUMMARY OF THE INVENTION

The present invention provides controlled movement of particles by attracting the particles to an electrode edge with a reduced force that allows the particles to be conveyed along the edge under the influence of liquid flow. The density and spacing of the particles at the electrode edge may be managed to meter individual or small groupings of particles to a particular location for analysis or treatment and then to release those particles. The invention provides sufficient control of the particles to allow positioning of a single particle between a particle-sized gap between two electrodes for electrical analysis of the particle.

Specifically, the present invention provides a channel for flowing a liquid with suspended particles along a transport axis. A first electrode supported within the channel has an electrode edge extending along the axis. An electrical power source is attached to the electrode for generating a first signal.

The first signal provides a dielectrophoretic force on the suspended particles of a strength drawing the particles to the edge while allowing the particles to move along the edge under the force of flowing liquid.

Thus, it is an object of at least one embodiment of the invention to provide for constrained movement of particles along a path defined by an electrode edge. By confining motion of the particles to a single dimension and taking advantage of mutual repulsion of the particles, precise metering and transport of particles may be obtained.

The particles may be bacteria and the electrical power source may provide a signal sufficient to draw the bacteria to the edge while allowing the bacteria to move along the edge under the flow of liquid. The signal may be set not to kill the bacteria.

It is thus another object of at least one embodiment of the invention to provide a transport mechanism suitable for cells and live cells.

The electrode may terminate within the channel at a downstream end adjacent to an analysis area.

Thus it is an object of at least one embodiment of the invention to provide a method of metering particles to an analysis area.

The electrode end may terminate in a sharpened point.

It is thus another object of at least one embodiment of the invention to provide a method of transporting particles to a point isolating the particle and facilitating analysis of one or a small grouping of particles.

The end may be adjacent to a second electrode in an electrical circuit with the power source and the first electrode. The first and second electrodes may be separated substantially by the size of one particle.

Thus it is another object of at least one embodiment of the invention to provide a method of positioning nanoscale particles between electrodes for electronic measurement.

The first signal may include a first component promoting dielectrophoretic force superimposed with a second component allowing independent measurement of the properties of conduction of the particles between the electrodes.

It is thus another object of at least one embodiment of the invention to provide for both transport and analysis of particles by the electrodes. It is another object of the invention to provide a device which may practically direct current through individual particles.

The apparatus may include an impedance measuring circuit communicating with the power source to measure the impedance between the electrodes.

Thus it is another object of at least one embodiment of the invention to provide for electronic detection and analysis of particles.

The power source may alternatively provide a signal drawing the particle to the edge while preventing the particle from moving along the edge under the flow of liquid.

Thus it is another object of at least one embodiment of the invention to provide for independent capture and transport of small particles along the electrode surface.

A controller may operate the power source to cease the electrical signals to release particles from the electrode after the analysis in the analysis area.

Thus it is another object of at least one embodiment of the invention to provide for the capture and release of cells for sequential sampling purposes.

The electrode may be angled with respect to the transport axis.

Thus it is another object of at least one embodiment of the invention to allow multiple electrodes having possibly divergent paths or convergent paths.

The apparatus may include an optical sensor for monitoring the presence of particles near at least one portion of the electrode.

Thus it is another object of at least one embodiment of the invention to allow the manipulation of particles also allowing optical analysis and/or detection.

These particular objects and advantages may apply to only some embodiments falling within the claims and thus do not define the scope of the invention.

DETAILED DESCRIPTION OF THE PREFERRED EMBODIMENT

Figure 1:
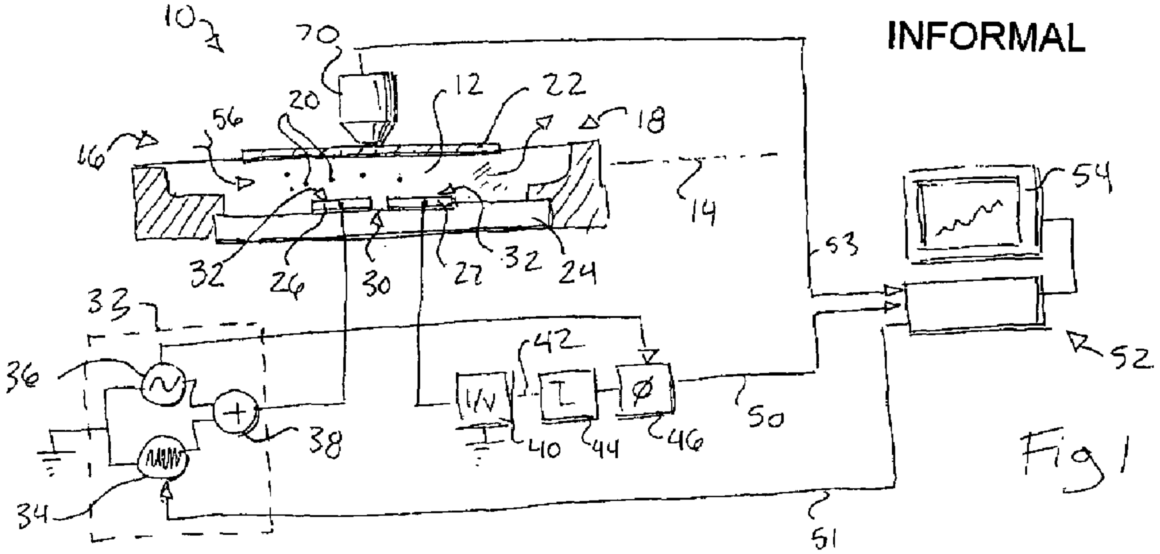
FIG. 1 is a block diagram of the present invention showing opposed electrodes positioned within a flow channel for receiving high and low frequency signals for the capture and transport of nanoscale particles suspended in a liquid.

Referring now to FIG. 1, a particle transport system 10 per the present invention employs a channel 12 extending along the longitudinal axis 14. The channel 12 provides generally an inlet 16 and outlet 18 opposed along the longitudinal axis 14 to allow fluid flow 56 through the channel 12 along the longitudinal axis 14. In one embodiment, the channel 12 may be three millimeters long along the longitudinal axis 14, two millimeters wide along a transverse axis (in and out of the page in FIG. 1) and 1.5 millimeters high. The channel 12 may be formed out of polydimethysiloxane (PDMS) molded into a channel shaped, for example, by application of liquid PDMS to an etched surface prepared using conventional machining or photolithography/etching techniques.

The fluid in the channel 12, in one embodiment, may be water or other liquid holding in suspension nano-sized particles 20, for example, nanospheres or nanorods or individual biological cells such as bacteria. A bacterium suitable for use with the present invention is *Bacillus mycoides*, a rod-shaped bacterium approximately one micron wide and five microns long. The bacterium provides a rigid interior coupled with an organic exterior that presents sites that could be used for biomolecular recognition in lieu of bio-functionalized inorganic structures of other nanoparticles. Such bacteria are substantially smaller than protoplasts, yeasts and eukaryotic cells which are typically 10 to 50 microns in diameter. Generally "nanoscale" and nanoparticle as used herein will be particles having a longest dimension of less than 1000 nm, and more typically less than 500 nm or 100 nm.

The channel 12 provides longitudinally extending PDMS sidewalls closed by a transparent cover slip 22 on an upper face and a silicon dioxide ($SiO_2$) coated silicon wafer 24 on a lower face. The latter silicon wafer 24 may be supported on a polyacrylic base (not shown).

The inner surface of the silicon wafer 24 facing the cover slip 22 and exposed to the liquid flowing through the channel 12 may support at least two longitudinally extending electrodes 26 and 27 having a longitudinal gap 30 therebetween and edges 32 extending along, but not necessarily parallel with, the longitudinal axis 14.

An electrical signal is applied by an electrical power source 33 across the gap 30 and between the electrodes 26 and 27. The electrical power source 33 includes two voltage sources. First, a high-frequency voltage source 34 provides a sine-wave signal of approximately one megahertz with a controllable amplitude ranging at least between 1.5 volts and 0.5 volts peak-to-peak. This signal will be used to provide dielectrophoresis forces on the particles 20. The signal from the high-frequency voltage source 34 is summed with a signal from a second, low-frequency voltage source 36 producing a sine-wave signal of from zero to 10 kilohertz at approximately 10 millivolts. This signal will be used as a detection signal and an analysis signal as will be described.

The signals from the high-frequency voltage source 34 and the low-frequency voltage source 36 are combined by summing amplifier 38 and applied to one of the electrodes 26. The remaining electrode 27 is connected through a current-to-voltage converter 40 which provides a virtual ground for the electrode 27 and thus a return path to the high-frequency voltage source 34 and low-frequency voltage source 36. The current-to-voltage converter 40 may provide a sensitivity of $10^4$ volts/ampere.

A voltage output 42 from the current-to-voltage converter 40 is received by a low pass filter 44 having a cut off frequency providing passage of the signal from the low-frequency voltage source 36 but blocking the signal from the high-frequency voltage source 34. This filtered signal is provided to a synchronous amplifier 46 of conventional design also receiving a signal directly from the low-frequency voltage source 36 to isolate asynchronous current provided by the low-frequency voltage source 36. The demodulated output 50 from the synchronous amplifier 46 thereby provides a measure of low frequency current conducted between the electrodes 26 and 27 largely insensitive to capacitive and inductive effects.

The demodulated output 50 is then provided to an analog-to-digital converter (not shown) forming an input to a control computer 52. The control computer 52 also incorporates to a digital-to-analog converter (not shown) applying a voltage control signal 51 to the high-frequency voltage source 34 controlling its amplitude as will be described. The control computer 52 may optionally receive a video signal 53 from a camera 70 viewing the electrodes 26 and 27 through the cover slip 22 as will be described further below The control computer 52 is programmable to execute a stored program to control the voltage of the high-frequency voltage source 34 for various operating modes as will be described below and to output a graphical representation of data collected from the demodulated output 50 and video signal 53 using a human machine interface 54 such as display terminal, keyboard mouse and the like.

Figure 2:
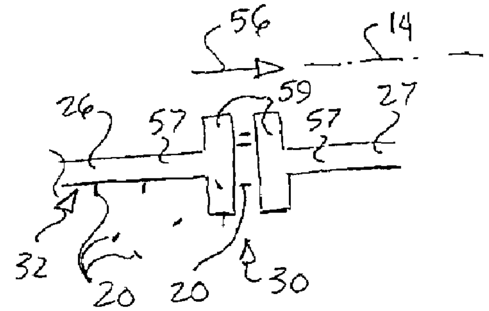
FIG. 2 is a top plan view of T-bar electrodes of FIG. 1 showing particles in various stages of capture, hold, transport and analysis.
Figure 3:
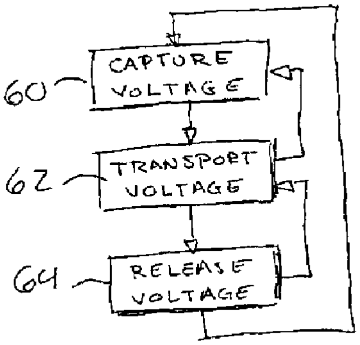
FIG. 3 is a simplified flow chart showing different modes of operation of the present invention under the control of a controller.

Referring now to FIGS. 2 and 3, an exemplary use of the particle transport system 10 of FIG. 1 provides a gentle liquid flow 56 of a liquid along the longitudinal axis 14 past electrodes 26 and 27. For example, the liquid may be a 90 percent water, 10 percent glycerol mixture suspending bacteria as particles 20, the liquid moving at a linear velocity of approximately 0.1 millimeter per second.

As indicated by process block 60 of FIG. 3, the control computer 52 may first apply capture voltage from the high-frequency voltage source 34 across the electrodes 26 and 27. This capture voltage, for example, a signal having 1.5 Volts peak to peak, causes some of the particles 20 to be drawn against the edge 32 of electrode 26 by virtue of the high electrical field gradient at the edge of the electrode 26. Lower voltages such as 200 mV may also be used. While the capture voltage is applied, the captured particles 20 do not move significantly under the influence of the liquid flow 56; however, if another particle 20 is captured, the adjacent particles will readjust their positions slightly. While Applicant does not wish to be bound by a particular theory, this readjustment may be a result of mutual electrostatic repulsion between the particles 20 caused by their induced charge.

The amplitude and frequency of the capture voltage can be used to discriminate between live and dead bacteria, and in addition is should be possible to discriminate between different species.

Referring to process block 62 after a predetermined period of time at which a desired number of particles 20 have been captured by the edge 32, the control computer 52 may change the voltage of the high-frequency voltage source 34 to a transport voltage, for example, 0.5 volts peak-to-peak. Under this voltage, the particles 20 are transported downward along the edge 32 under the influence of the flow 56 of liquid while retained at the edge 32.

In the example of FIG. 2, the electrodes 26 and 27 provide for an opposed T-bar configuration with longitudinally extending electrode trunks 57 terminating in opposition at transversely extending T-bars 59 perpendicular to the longitudinally extending electrode trunks 57. The T-bars 59 are separated by a gap 30 approximately equal to the longest dimension of the particles 20.

While the control computer 52 continues to apply the transport voltage, particles 20 will continue to move in the direction of the flow 56 either passing around the T-bar 59 or across its top under the influence of the flow 56. When at least one particle 20 is within the gap 30, it is held against further movement by the force of two the transverse edges of the T-bars 59 of the electrodes 26 and 27 and thus may resist further movement with the flow 56.

If the transport voltage is retained, then particles 20 will continue to accumulate within the gap 30 after moving conveyor-like along the edge 32.

The gap 30 may be at an analysis area whereby analysis or treatment of individual particles 20 may be performed. This analysis, which may include detection, may be performed by the signal (for example 20 millivolts peak to peak) from the low-frequency voltage source 36 passing through the particle 20 from electrode 26 to electrode 27, as will be described, but may alternatively be optical analysis using a camera 70 including but not limited to analysis with visual frequencies of light or fluorescence measurement using visible or ultraviolet light frequencies. The analysis may further include treatment of the individual particles 20 with reagents or other substances introduced near the gap 30.

Referring to FIG. 3, once sufficient particles 20 have accumulated in the analysis area of the gap 30, the capture voltage of process block 60 may be restored preventing additional particles from moving along the edge 32 into the gap 30.

Upon completion of the analysis of the particular particles 20 in the gap 30, the control computer 52 may change the voltage on the high-frequency voltage source 34 to a release voltage indicated by a process block 64, for example 10 millivolts, allowing release of the particles within the gap 30 to continue with the flow 56.

When the release voltage is applied, the particles 20 attached to the edge 32 are also released but because their natural trajectory is along the edge 32 they may be reattached to the edge 32 when the transport voltage of process block 62 is restored.

The application of capture, transport, and release voltage may be flexibly controlled and timed to manipulate the particles 20 into and out of the region of the gap 30.

Applicant has determined that bacterial samples captured with this device using the described voltages may be released without damage to the bacteria. At larger voltages greater than 2 volts peak to peak, however, the bacteria are irreversibly immobilized possibly because of perforation of the cell walls.

Figure 4:
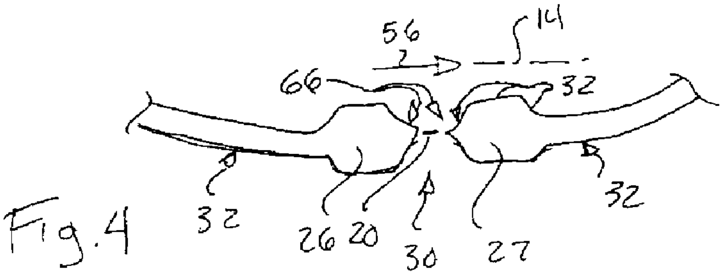
FIG. 4 is a figure similar to that of FIG. 3 showing a tear-drop design for the electrodes of FIG. 2 having electrode edges transporting particles at an angle along the axis of flow of the channel.

Referring now to FIG. 4, an alternative electrode design provides a “teardrop” end to the electrodes 26 and 27 in which no surface of the ends is perpendicular to the flow 56. Again the ends of the electrodes 26 and 27 are separated across a gap 30 substantially equal to the dimension of the particles 20; however the gap 30 provides for opposed sharpened points 66 suitable for concentrating and locating a single particle 20 both longitudinally and transversely in a particular location. The gap 30 is approximately 3.5 microns for these electrodes. A “pearl-chain” structure, in which bacteria are aligned end-to-end, can be created using an electrode structure with a larger gap. In this process, one particle is captured and directed to the gap, and then another particle applied, etc, to create a controlled sequence of particles that is electrically verifiable.

The edge 32 of the electrodes 26 and 27 in this example are also not perfectly aligned with the longitudinal axis 14. This ability to cant the electrode edges 32 allows diverging and converging electrodes that may be useful for sorting or separating bacterial or nanoparticle samples.

Referring again to FIG. 1, the location of a particle 20 within the gap 30 may be confirmed by means of the camera 70 coupled to a microscope objective focusing through the cover slip 22 to the gap 30. Alternatively or in addition the present invention contemplates that the particles 20 arriving in the gap 30 may be detected electronically by monitoring the current attributable to the signal from low-frequency voltage source 36. This current may be used to deduce the impedance across the gap using the known voltage of the low-frequency voltage source 36 (for example 20 $mV_{pp}$) in Ohm's law and may be calculated by the control computer 52.

A larger voltages may be used to provide a semi-permanent “fixation” of cells between electrode gap 30. In this way, the cells may be adhered to particular locations and receptors on their surface as a scaffold for building more complex nanostructures. A voltage on the order of 2 V is appears to be sufficient to “glue” the bacteria in place to that a continued voltage is no longer required to hold them to the electrode.

Figure 5:
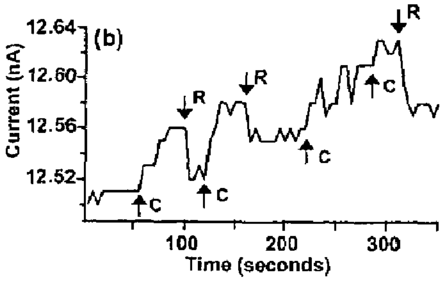
FIG. 5 is a graph plotting impedance across the gap between the electrodes of FIG. 4 as a function of time and showing detection and analysis of the particles based on changes in impedance across the gap for individual particles.

Referring now to FIG. 5, a measurement of that current with time shows changes in current flow and thus impedance across the gap caused by the capture and release of bacterium at points labeled R for release and C for capture. As can be seen, the capture of bacteria particles 20 lowers the impedance across the gap 30 whereas the release provides for an abrupt increase in that impedance. A combination of video monitoring and impedance monitoring may be performed. The changes in current are not instantaneous but occur slowly over the period of about twenty seconds. While the Applicants do not wish to be bound by a particular theory, it is believed that in some cases bacteria do not bridge perfectly and make and break the electrical contact several times. It is possible that slow changes in the polysaccharide layer occur over the time span of twenty seconds to improve electrical contact. Over the course of several minutes, there is a steady increase in background current which is believed to be the result of ions that leak from the bacteria over time increasing solution conductivity. Controlled experiments using a solution lacking bacteria show no such increase.

Other types of electrical analysis of the particles 20 may be performed using this technique, including, for example, a frequency response, by sweeping the frequency of the sine wave signal from low-frequency voltage source 36 and monitoring impedance as a function of frequency. No notable differences in frequency response were observed between individual bacterium by the inventors; however, frequency response may help to distinguish other forms of nanoparticles including other types bacterium or man-made nanoparticles incidentally or by design having particular frequency response characteristics.

One benefit of the use of bacterial cells, as opposed to manmade nanoscale objects such as nanotubes and nanowires, is that the external surfaces of the bacteria may be engineered or selected to express specific proteins and thus may be further manipulated with secondary biological interaction such as antibody binding to create more complex nanoscale structures.

Generally, the ability to manipulate particles 20 by transporting them controllably along a defined edge 32 may be used in a variety of applications including the sorting of particular cells.

It is specifically intended that the present invention not be limited to the embodiments and illustrations contained herein, but include modified forms of those embodiments including portions of the embodiments and combinations of elements of different embodiments as come within the scope of the following claims.

We claim:

1. An apparatus for transport of particles comprising:

a channel for supporting a flow of liquid and suspended particles along a transport axis;

a first electrode supported within the channel having an electrode edge extending along the axis;

an electrical power source attached to the electrode and generating a first signal providing a dielectrophoretic force on the suspended particles of a strength drawing the particles to the edge while allowing the particles to move along the edge under the flow of liquid; and wherein the first electrode terminates within the channel at a downstream end adjacent to an analysis area providing analysis of the particles; and wherein the end provides a substantially sharpened point.

2. The apparatus of claim 1 wherein the first and second electrodes are separated substantially by a size of one particle.

3. An apparatus for transport of particles comprising:

a channel for supporting a flow of liquid and suspended particles along a transport axis;

a first electrode supported within the channel having an electrode edge extending along the axis;

an electrical power source attached to the electrode and generating a first signal providing a dielectrophoretic force on the suspended particles of a strength drawing the particles to the edge while allowing the particles to move along the edge under the flow of liquid; and wherein the first electrode terminates within the channel at a downstream end adjacent to an analysis area providing analysis of the particles; and wherein the end is adjacent to a second electrode, wherein the second electrode is in an electrical circuit with the power source and the first electrode; and wherein the first signal includes a first component promoting a dielectrophoretic force superimposed with a second component allowing independent measurement of properties of conduction of particles between the first and second electrodes.

4. The apparatus of claim 3 wherein the particles are bacteria and the electrical power source provides a signal holding the bacteria to the edge while allowing the bacteria to move along the edge under the flow of liquid.

5. The apparatus of claim 4 wherein the bacteria are live bacteria and the electrical power source provides a signal holding the bacteria to the edge and allowing the bacteria to move along the edge under the flow of liquid without killing the bacteria.

6. The apparatus of claim 3 including an impedance measuring circuit communicating with the power source to measure the impedance between the electrodes.

7. The apparatus of claim 3 wherein the electrode edge is angled with respect to the axis.

8. The apparatus of claim 3 further including an optical sensor for monitoring a presence of particles near at least one portion of the electrode.

9. The apparatus of claim 3 wherein the particles are nanoscale particles.

10. An apparatus for transport of particles comprising:

a channel for supporting a flow of liquid and suspended particles along a transport axis;

a first electrode supported within the channel having an electrode edge extending along the axis;

an electrical power source attached to the electrode and generating a first signal providing a dielectrophoretic force on the suspended particles of a strength drawing the particles to the edge while allowing the particles to move along the edge under the flow of liquid;

wherein the power source alternatively provides a second signal drawing the particle to the edge while preventing the particle from moving along the edge under the flow of liquid.

11. The apparatus of claim 10 including a power source controller operating the power source to produce the second signal to draw particles to the first electrode for a first predetermined time and then to produce the first signal to allow the particles to move along the first electrode under the flow of liquid.

12. The apparatus of claim 11 wherein the first electrode terminates within the channel at a downstream end adjacent to an analysis area providing analysis of the particles and wherein the power source controller operates the power source to produce the first and second signals to deliver a controlled number of particles to the analysis area.

13. The apparatus of claim 12 wherein the controller operates the power source to cease the first and second signals to release particles from the electrode after analysis in the analysis area.

14. A method of controllably transporting particles comprising the steps of:

(a) flowing a liquid suspension of particles along a transport axis past a first electrode supported within the liquid having an electrode edge extending along the axis; and (b) applying a first signal to the electrode creating a dielectrophoretic force on the suspended particles of a strength sufficient to draw the particles to the edge while allowing the particles to move along the edge under the flow of liquid;

wherein the first electrode terminates within the liquid at a downstream end adjacent to an analysis area and including the step of: analysis of the particles at the analysis area; and wherein the downstream end is adjacent to a second electrode completing an electrical circuit providing the first signal, and wherein the first signal includes a first component promoting a dielectrophoretic force superimposed with a second component and including the step of measuring the electrical property of particles between the first and second electrodes using the second component.

15. The method of claim 14 wherein the particles are bacteria.

16. The method of claim 15 wherein the bacteria are live bacteria and the first signal holds the bacteria to the edge and allows the bacteria to move along the edge under the flow of liquid without killing the bacteria.

17. The method of claim 14 wherein the downstream end provides a substantially sharpened point.

18. The method of claim 14 wherein the first and second electrodes are separated substantially by a size of one particle.

19. The method of claim 14 wherein the electrical property is impedance between the electrodes.

20. The method of claim 14 wherein the electrode edge is angled with respect to the axis.

21. The method of claim 14 further including an optical sensor and including the step of: optically monitoring a presence of particles near at least one portion of the electrode.

22. A method of controllably transporting particles comprising the steps of:

(a) flowing a liquid suspension of particles along a transport axis past a first electrode supported within the liquid having an electrode edge extending along the axis; and (b) applying a first signal to the electrode creating a dielectrophoretic force on the suspended particles of a strength sufficient to draw the particles to the edge while allowing the particles to move along the edge under the flow of liquid;

including the step of: switching between the first signal and a second signal, the second signal drawing the particle to the edge while preventing the particle from moving along the edge under the flow of liquid.

23. The method of claim 22 including the step of applying the second signal to draw particles to the first electrode for a first predetermined time and then applying the first signal to allow the particles to move along the first electrode under the flow of liquid.

24. The method of claim 22 wherein the first electrode terminates within the liquid at a downstream end adjacent to an analysis area providing analysis of the particles and including the step of: switching between the first and second signals to deliver a controlled number of particles to the analysis area.

25. The method of claim 24 including the step of: ceasing the first signal to release particles from the electrode after analysis in the analysis area.

26. An apparatus for transport of particles comprising:

a channel for supporting a liquid having suspended particles; a first electrode and second electrode supported within the channel having opposed ends separated by substantially a size of a particle;

an electrical power source attached to the first and second electrodes and generating a signal to create a dielectrophoretic force on a suspended particle to guide the particle between the ends; and an electrical monitor circuit measuring the electrical properties of conduction of particles between the electrodes.

27. The apparatus of claim 26 wherein the ends provide opposed substantially sharpened points.

28. The apparatus of claim 26 wherein the signal includes a first component promoting a dielectrophoretic force superimposed with a second component detected by the electrical monitor circuit.

29. The apparatus of claim 28 including an impedance measuring circuit communicating with the power source to measure the impedance between the electrodes.

* * * * *